July 24, 1962 K. O. JOHNSON 3,045,938

TAPE DRIVING APPARATUS

Filed Oct. 29, 1958

INVENTOR.
Keith O. Johnson

BY Flehr & Swain

ATTORNEYS 3,045,938
Patented July 24, 1962

3,045,938

TAPE DRIVING APPARATUS

Keith O. Johnson, San Carlos, Calif., assignor to Ampex Corporation, Redwood City, Calif., a corporation of California Filed Oct. 29, 1958, Ser. No. 770,495
5 Claims. (Cl. 242—55.12)

This invention relates generally to machines making use of a pliable tape record medium, such as a magnetic tape, for recording and/or reproducing sound or other recordable signals.

Magnetic tape machines generally employ supply and take-up reels which are carried by turntables or similar mounting means. The tape is driven at a constant speed by pressing the same into frictional contact with the peripheral surface of a driving capstan, and is drawn across a magnetic head or like transducer device. The higher quality machines have electric motors for the turnables, and an additional motor for driving the capstan. During recording or playback the motor for the supply reel is energized to provide torque for maintaining back tension upon the tape, while the motor for the take-up reel is energized to provide sufficient torque to wind up the tape. Provision is made for energizing the turntable motors for fast forward or rewind operations, during which times the tape is released from driving contact with the capstan.

With machines as described above, tape tension is dependent upon the torque provided by the motor associated with the supply turntable, although such tension tends to vary with changes in the diameter of the tape roll upon the supply reel. It is well known that variations in tape tension are undesirable, particularly since such variations cause unequal tape stretching, and changes in contact pressure between the tensioned tape portion and the magnetic transducer head. Instead of maintaining tape tension in the manner described above, certain machines maintain a so-called closed tape loop. The tape forming the loop is maintained under tension and is guided for contact with the magnetic head or heads. For example, as disclosed in copending application Serial No. 636,596, in the names of Schoebel and Selsted, the closed tape loop therein shown is guided over an idler capstan, and the side lengths of the loop are adapted to be clamped into driving relation with opposite sides of a driving capstan. Sufficient tension is applied to the tape between the supply reel and the driving capstan whereby the driving engagements of the capstan with the tape maintains a desired loop tension. While such an arrangement maintains a tensioned loop which is relatively isolated from the reels, two tape clamping rollers must be employed with operating means for the same, and the loop tension is not completely independent of the tension applied to the tape portions extending from the capstan drive to the reels.

In general it is an object of the present invention to provide a simple and effective tape driving means of the closed loop type, which will serve to maintain constant tape tension.

A further object of the invention is to provide a driving means of the above character which requires only one driving capstan and one tape clamping roller.

Another object of the invention is to provide means of the above character having a novel form of differential driving action which serves to maintain a desired tape tension.

Another object of the invention is to provide an improved machine of the tape type having a novel arrangement between a closed tensioned tape loop, and the tape storage reels.

Additional objects and features of the invention will appear from the following description in which the preferred embodiments have been set forth in detail in conjunction with the accompanying drawing.

Referring to the drawing.

In accordance with the present invention I employ a single driving capstan, together with a single roll or other tape pressing means adapted to press the tape into driving relation with the capstan. The tape is guided in such a manner that it is caused to form a closed loop, with the input and output portions of the loop in superposed relation between the capstan and presser roll. As will be presently explained the net result is to cause a differential driving action which serves to automatically maintain the closed loop tension.

Figure 1:
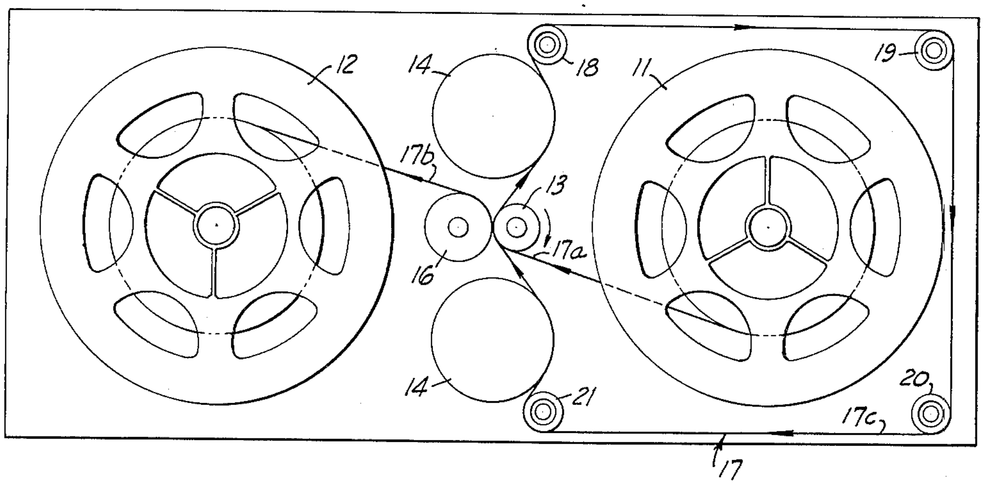
FIGURE 1 is a plan view schematically illustrating a magnetic tape machine incorporating the present invention.

In FIGURE 1 of the drawing I have shown a magnetic tape machine having tape supply and take-up reels 11 and 12 carried by turntables or like rotatable mounting means (not shown). A tape driving capstan 13 is adapted to be driven by a suitable electric motor or like means (not shown), and is adapted to drive the tape past one or more magnetic heads 14. A roller 16 is adapted to press the tape into driving relation with the peripheral surface of the capstan, and may be surfaced with a layer of natural or synthetic resilient rubber. In accordance with customary practice, the means employed (not shown) for rotatably mounting this roller, permits movement of the same to either a release position spaced from the driving capstan, or a tape driving position in which it is pressed against the capstan.

Magnetic tape 17 is shown extending from the supply to the take-up reel. A portion **17*a* of this tape engages the capstan 13, and a portion 17*b* extends about the roller 16 to the take-up reel 12. Another tape portion 17*c* forms a closed loop, and is shown engaging the guide studs or rollers 18, 19, 20 and 21. Guide studs 18 and 21 are disposed to cause portions of the loop (when trimmed) to be pressed against the magnetic heads 14**.

Figure 2:
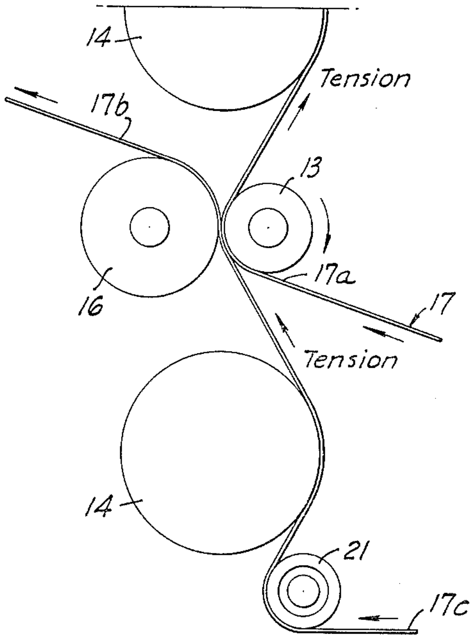
FIGURE 2 is a diagram illustrating the differential driving action.

As shown particularly in FIGURE 2, the input and output tape portions **17*a* and 17*b* are disposed in superposed relation between the capstan 13 and roller 16. Thus when the roller 16 is urged toward the capstan, the input tape portion 17*a* is driven by direct frictional contact with the surface of the capstan, while the output tape portion 17*b* is driven by being fricionally pressed against the outer surface of the tape portion 17*a*. Neglecting other factors this causes the two superposed tape portions to be driven on different radii, with the result that there is a tendency for the output tape portion 17*b* to be driven at a speed slightly greater than the input portion 17*a*. More specifically the tape portion 17*a*** is driven at a rate ($S_1$) in accordance with the following equation:

$$S_1=w(r+t_1)2\pi$$

Where $w$ equals angular velocity, $r$ equals the capstan radius, and $t_1$ equals the distance between capstan and the turing radius of the inner tape (zero for good tape to capstan contact).

That portion of the tape **17*c*** within the loop, is driven at a rate ($S_2$) in accordance with the following equation:

$$S_2=w(r+t_2)2\pi$$

Where $t_2$ equals the distance between the capstan and the turning radius of the outer tape (approximately the thickness of the tape).

Assuming that the machine is in operation with the superposed tape portions **17*a* and 17*b* being pressed against the capstan, with clamping pressure comparable to accepted magnetic tape recorder practice, the inherent difference in driving rates explained above quickly develops tape tension in the loop 17***c*, and as the loop tension increases, compensating factors are developed which make for driving of the tape portions 17*a* and 17*b* at equal rates, for a desired predetermined tape loop tension. The compensating factors include tape stretch with resultant thinning of the tape. For changing roller pressures between reasonable maximum and minimum limits, the tape loop tension remains substantially constant. Below such minimum pressure the tension is reduced, and above such maximum the tension increases. Tape tension is dependent upon the physical properties and dimensions of the tape employed. For example, tension increases with an increase in tape thickness. Also, it is dependent upon the capstan diameter, in that an increase in the diameter of the capstan tends to decrease tape tension.

It will be evident that the invention described above has a number of desirable features. Tape loop tension is maintained by relatively simple tape driving means, involving the use of a single driving capstan and a single clamping roller. The loop tension remains constant and is independent of varying tape tension between the capstan driving means and the reels or variations in clamping pressure between reasonable limits. This makes it possible for the means employed to apply torques to the reels and the associated turntables to be relatively simple and inexpensive.

In the preferred form of the invention described above, the tape loop surrounds one of the tape reels. This makes it possible to guide the tape on one level, corresponding to the level of the reels, thus simplifying the construction of the machine and facilitating manual threading operations.

I claim:

1. In apparatus for driving an elongated pliable record tape, a driving capstan having a peripheral surface for frictional contact with the tape, a single pinch roller for pressing tape into driving relation with the capstan, and guide means for engaging and maintaining a closed loop portion of the tape, said loop portion having input and output tape portions in superposed relation and in frictional slipping contact with one another between the driving capstan and the pinch roller, whereby such tape loop is maintained under tension by differential driving action.

2. Apparatus in claim 1 together with transducer means engaging a portion of the tensioned loop.

3. In apparatus for driving an elongated pliable record tape, a driving capstan having a peripheral surface for frictional contact with the tape, tape guiding means for engaging and maintaining a closed tape loop portion, the loop portion having input nad output tape portions, said tape guiding means serving to direct said input and output tape portions in superposed relationship and in frictional slipping contact with one another alongside the driving surface of the capstan, and a single pinch roller adapted to press the superposed portions of the tape against the driving capstan, whereby the tape loop is maintained under tension by virtue of differential driving action.

4. In a magnetic tape machine, rotatable means for mounting tape supply and take up reels, said reels serving to store an elongated pliable record tape, with a portion of the tape extending between the reels, a driving capstan having a peripheral surface for frictional contact with the tape, a single pinch roller for pressing tape into driving relation with the capstan, and guide means for engaging and maintaining a closed loop portion of the tape, with said closed loop portion generally surrounding one of said reels, the loop portion having input and output tape portions in superposed relation and in frictional slipping contact with one another between the driving capstan and the pinch roller, whereby the tape loop is maintained under tension by differential driving action.

5. Apparatus as in claim 4 in which all of said tape loop is in a general plane corresponding to the general plane of said one reel.

References Cited in the file of this patent

UNITED STATES PATENTS

| | | |
|---|---|---|
| 503,391 | Toye | Aug. 15, 1893 |
| 1,260,595 | Thompson | Mar. 26, 1918 |
| 1,829,727 | Barrett | Nov. 3, 1931 |
| 2,059,834 | Wittel | Nov. 3, 1936 |
| 2,553,834 | Rohland | May 22, 1951 |
| 2,745,604 | Masterson | May 15, 1956 |
| 2,869,799 | Hunter | Jan. 20, 1959 |
| 2,872,188 | Harkins et al. | Feb. 3, 1959 |
| 2,913,192 | Mullin | Nov. 17, 1959 |